(12) United States Patent
Wang et al.

(10) Patent No.: US 9,810,912 B2
(45) Date of Patent: Nov. 7, 2017

(54) LIQUID CRYSTAL LENS, MANUFACTURING METHOD AND DISPLAY DEVICE

(71) Applicant: BOE Technology Group Co., Ltd., Beijing (CN)

(72) Inventors: Qiangtao Wang, Beijing (CN); Hyun Sic Choi, Beijing (CN); Jing Lv, Beijing (CN); Zheng Fang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 222 days.

(21) Appl. No.: 14/408,826

(22) PCT Filed: May 20, 2014

(86) PCT No.: PCT/CN2014/077922
§ 371 (c)(1),
(2) Date: Dec. 17, 2014

(87) PCT Pub. No.: WO2015/070585
PCT Pub. Date: May 21, 2015

(65) Prior Publication Data
US 2016/0313565 A1    Oct. 27, 2016

(30) Foreign Application Priority Data
Nov. 15, 2013    (CN) .......................... 2013 1 0575136

(51) Int. Cl.
*G02F 1/1339* (2006.01)
*G02B 27/22* (2006.01)
(Continued)

(52) U.S. Cl.
CPC ......... *G02B 27/2214* (2013.01); *G02B 27/22* (2013.01); *G02F 1/1339* (2013.01);
(Continued)

(58) Field of Classification Search
CPC .................. G02F 1/133365; G02F 1/1339
See application file for complete search history.

(56) References Cited

U.S. PATENT DOCUMENTS 6,449,028 B1 * 9/2002 Grupp .................. G02F 1/1339
349/127
2004/0032561 A1    2/2004 Kumar et al.
(Continued)

FOREIGN PATENT DOCUMENTS

CN    1106929 A    8/1995
CN    1239232 A    12/1999
(Continued)

OTHER PUBLICATIONS

May 17, 2016—International Preliminary Report on Patentability Appn PCT/CN2014/077922.
(Continued)

*Primary Examiner* — Edmond Lau
(74) *Attorney, Agent, or Firm* — Banner & Witcoff, Ltd.

(57) ABSTRACT

A liquid crystal (LC) lens, a manufacturing method thereof and a display device are provided. The LC lens comprises a first substrate, a second substrate and a liquid crystal layer disposed between the first substrate and the second substrate. A plurality of electrode groups is disposed on the first substrate; each electrode group comprises a plurality of mutually insulated electrodes; and a transparent partition is disposed between two adjacent electrode groups. The LC lens can avoid LC disclination in the area between two adjacent strip electrode groups and hence avoid the influence of 3D display effect.

12 Claims, 2 Drawing Sheets

(51) Int. Cl.
*G02F 1/29* (2006.01)
*G02F 1/1333* (2006.01)
*G02F 1/1343* (2006.01)

(52) U.S. Cl.
CPC .... *G02F 1/13439* (2013.01); *G02F 1/133365* (2013.01); *G02F 1/134309* (2013.01); *G02F 1/29* (2013.01); *G02F 2201/121* (2013.01); *G02F 2202/022* (2013.01)

(56) References Cited

U.S. PATENT DOCUMENTS

| | | | |
|---|---|---|---|
| 2008/0111964 A1 | 5/2008 | Shirasaka et al. | |
| 2010/0007807 A1 | 1/2010 | Galstian et al. | |
| 2013/0063691 A1* | 3/2013 | Takama | G02F 1/29 349/143 |
| 2014/0063421 A1 | 3/2014 | You et al. | |

FOREIGN PATENT DOCUMENTS

| | | |
|---|---|---|
| CN | 101299121 A | 11/2008 |
| CN | 102053445 A | 5/2011 |
| CN | 102207657 A | 10/2011 |
| CN | 202472183 U | 10/2012 |
| CN | 202600323 U | 12/2012 |
| CN | 202854411 U | 4/2013 |
| CN | 103176308 A | 6/2013 |
| CN | 103558724 A | 2/2014 |
| JP | 2002366302 A | 12/2002 |
| TW | 201020661 A | 6/2010 |

OTHER PUBLICATIONS

Sep. 28, 2014—(CN) First Office Action—App 201310575136.0—with Eng Tran.
International Search Report and Written Opinion dated Jul. 23, 2014 (PCT/CN2014/077922); ISA/CN.

\* cited by examiner

LIQUID CRYSTAL LENS, MANUFACTURING METHOD AND DISPLAY DEVICE

The application is a U.S. National Phase Entry of International Application PCT/CN2014/077922 filed on May 20, 2014, designating the United States of America and claiming priority to Chinese Patent Application No. 201310575136.0, filed on Nov. 15, 2013. The present application claims priority to and the benefit of the above-identified applications and the above-identified applications are incorporated by reference herein in their entirety.

TECHNICAL FIELD

Embodiments of the present invention relate to a liquid crystal (LC) lens, a manufacturing method thereof and a display device.

BACKGROUND

In recent years, three-dimensional (3D) display has become one of the main trends in the display field. The basic principle of 3D display is based on the fact the left eye and right eye of a human receive different images respectively. Two eyes of the human being have an interval of about 65 mm therebetween. Due to the positional difference, the left eye and the right eye will see different two-dimensional (2D) images; subsequently, the brain performs superimposition and regeneration on information of different 2D images received by the left eye and the right eye, and hence an image with front-rear, up-down, left-right and far-near 3D direction effect can be obtained.

The 3D display technology can be embodied with the help of special glasses. The wearing of the special glasses will reduce the application scope of 3D display and the use comfort. In addition, glasses-free 3D display technology has gradually become mature. A glasses-free (naked-eye) 3D display device comprises a display panel and a grating. The grating comprises a plurality of grating units. The grating is disposed in front of the display panel by a certain means. An image displayed by the display panel is divided into a left-eye image and a right-eye image by the grating. Thus, different visual images can be viewed by two eyes of the human being, and hence 3D effect can be obtained.

SUMMARY

At least one embodiment of the present invention provides an LC lens, which comprises a first substrate, a second substrate and a liquid crystal layer disposed between the first substrate and the second substrate. A plurality of electrode groups is disposed on the first substrate; each electrode group comprises a plurality of mutually insulated electrodes; and a transparent partition is disposed between two adjacent electrode groups.

In one embodiment, the transparent partition runs through the whole liquid crystal layer.

In one embodiment, common electrodes are respectively disposed on the first substrate and/or the second substrate, at positions corresponding to the transparent partitions.

At least one embodiment of the present invention provides a method for manufacturing an LC lens, which comprises: providing a first substrate, in which a plurality of electrode groups is formed on the first substrate and each electrode group comprises a plurality of mutually insulated electrodes; providing a second substrate; and arranging the first substrate and the second substrate opposite to each other, providing liquid crystals between the first substrate and the second substrate, and providing a transparent partition between two adjacent electrode groups.

In one embodiment, common electrodes are respectively disposed on the first substrate and/or the second substrate, at positions corresponding to the transparent partitions; a liquid crystal polymer and a photoinitiator are added into liquid crystals; the common electrodes respectively disposed on the first substrate and/or the second substrate, at the positions corresponding to the transparent partitions, are applied with a voltage; at least areas corresponding to the transparent partitions are irradiated by ultraviolet light; the process of applying the voltage to the common electrodes respectively disposed on the first substrate and/or the second substrate, at the positions corresponding to the transparent partitions, and the process of ultraviolet irradiation are stopped.

At least one embodiment of the present invention provides a display device, which comprises any foregoing LC lens provided by the embodiment of the present invention.

In the LC lens, the manufacturing method thereof and the display device, provided by the embodiment of the present invention, as a transparent partition is disposed between two adjacent electrode groups, the area between two adjacent electrode groups will not be subjected to LC disclination, and hence the 3D effect can be improved.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

REFERENCE NUMERALS

1—Upper Substrate; 2—Lower Substrate; 3—Liquid Crystal Layer; 10—Electrode Group; 11—Electrode; 21—Common Electrode; 22—Partition.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
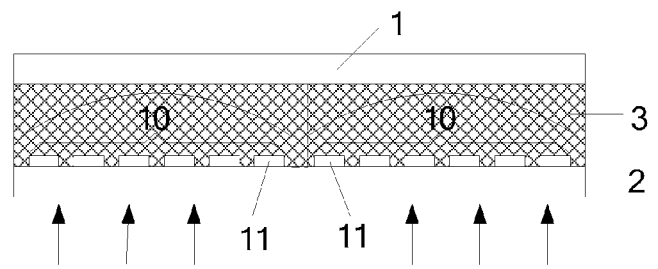
FIG. 1 is a partial schematic structural view of a liquid crystal (LC) lens.
Figure 2:
FIG. 2 is a schematic diagram illustrating the LC arrangement of the LC lens as shown in FIG. 1.

The structure of an LC lens is as shown in FIG. 1. The LC lens comprises an upper substrate 1 and a lower substrate 2 subjected to a cell-assembly process and a liquid crystal layer 3 interposed between the upper substrate 1 and the lower substrate 2. A plurality of strip electrode groups 10 is disposed on the lower substrate 2. Each strip electrode group 10 comprises a plurality of strip electrodes 11. A gradient electric field can be formed by applying different voltages to different strip electrodes 11, so that the forces applied to liquid crystals by the electric field at different positions are different, the rotation direction of the liquid crystals is different, and hence the effect of the LC lens can be achieved. A plurality of lens units are formed by the plurality of strip electrode groups correspondingly, and hence glasses-free 3D display can be achieved. As illustrated in FIG. 1, strip electrodes 11 in two adjacent strip electrode groups 10 will interfere with each other; liquid crystals in the area (the area represented by dotted lines in FIG. 1) between two adjacent strip electrode groups 10 will be subjected to phase shift; light is deflected towards undesirable directions when passing through the area, namely LC disclination is caused, as shown in FIG. 2. Thus, light received by the left eye and the right eye will be mixed, and hence the 3D effect can be affected undesirably.

At least one embodiment of the present invention provides an LC lens, which comprises an upper substrate, a lower substrate and a liquid crystal layer interposed between the upper substrate and the lower substrate. A plurality of electrode groups is disposed on the upper substrate or the lower substrate; each electrode group comprises a plurality of mutually insulated electrodes; and a transparent partition is disposed between two adjacent electrode groups. Due to the transparent partition, liquid crystals on both sides of the partition will have respective deflection angles. The upper substrate and the lower substrate are, for instance, examples of the first substrate and the second substrate in the embodiment of the present invention.

Figure 3:
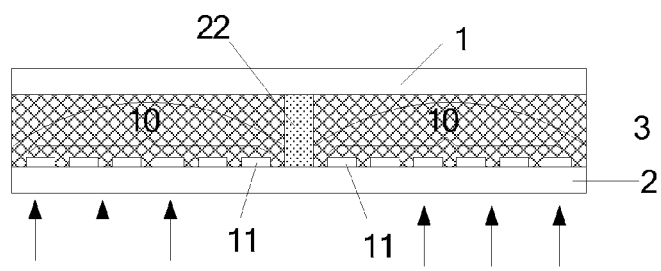
FIG. 3 is a partial schematic structural view of an LC lens provided by an embodiment of the present invention.
Figure 4:
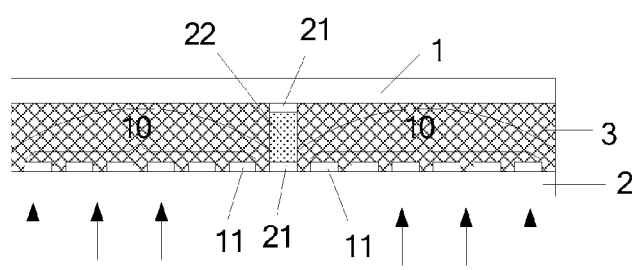
FIG. 4 is a partial schematic structural view of an LC lens provided by another embodiment of the present invention.

In at least one embodiment of the present invention, a plurality of electrode groups may be disposed on the upper substrate or may be disposed on the lower substrate. As illustrated in FIGS. 3 and 4, detailed description is given in the embodiment of the present invention by taking the configuration that the plurality of electrode groups 10 are disposed on the lower substrate 2 as an example. It should be noted that the LC lens comprises a plurality of electrode groups; different voltages in magnitude are applied to electrodes in each electrode group to make liquid crystals have different deflection angles; and in this way each electrode group is equivalent to a convex lens. Detailed description is given in at least one embodiment of the present invention by taking two adjacent electrode groups as an example.

As illustrated in FIGS. 3 and 4, the LC lens comprises an upper substrate 1, a lower substrate 2 and a liquid crystal layer 3 interposed between the upper substrate 1 and the lower substrate 2; electrode groups 10 are disposed on the upper substrate 1 or the lower substrate 2; each electrode group 10 comprises a plurality of mutually insulated electrodes 11; and a transparent partition 22 is disposed between two adjacent electrode groups 10. Due to the transparent partition 22, liquid crystals on both sides thereof have a certain deflection angle. For instance, the transparent partition 22 may be a partition configured to possess alignment function. The liquid crystals on both sides of the partition have a certain deflection angle due to the transparent partition. Thus, the liquid crystals will not be deflected randomly, and hence the display effect can be improved. The transparent partition 22 is, for instance, prepared by a material with alignment function such as polyimide (PI).

Figure 5:
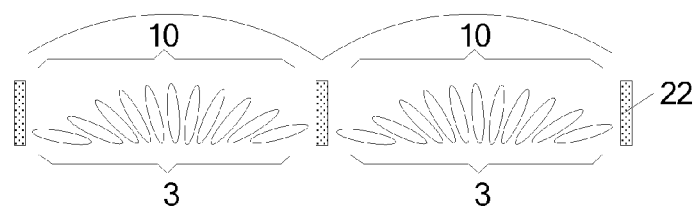
FIG. 5 is a schematic diagram illustrating the LC arrangement of the LC lens provided by the embodiment of the present invention.

In the LC lens as shown in FIG. 1, liquid crystals in the area between two adjacent electrode groups 10 are unstably aligned due to the interference of the electrodes of different electrode groups, and hence LC disclination can be caused. In at least one embodiment of the present invention, a transparent partition is disposed between two adjacent electrode groups. As illustrated in FIG. 5, liquid crystals in the electrode groups can be stably aligned. Thus, LC disclination can be avoided, and hence the 3D effect can be improved.

In the LC lens provided by at least one embodiment of the present invention, as the transparent partition is disposed between two adjacent electrode groups, the liquid crystals on both sides of the transparent partition have a certain deflection angle; the liquid crystals in the electrode groups are stably aligned; LC disclination will not be caused in the area between two adjacent electrode group; and hence the 3D effect can be improved.

For instance, the LC lens provided by at least one embodiment of the present invention may be a Fresnel lens.

The transparent partition in at least one embodiment of the present invention is configured to prevent the disclination of liquid crystals between two adjacent electrode groups. FIG. 3 is a partial schematic structural view of an LC lens provided by one embodiment of the present invention. As illustrated in FIG. 3, the transparent partition 22 may run through the whole liquid crystal layer and makes direct contact with the upper substrate and the lower substrate. FIG. 4 is a partial schematic structural view of an LC lens provided by another embodiment of the present invention. Other structures may be provided as well. For instance, common electrodes 21 are respectively disposed on the upper substrate and/or the lower substrate, at positions corresponding to the transparent partitions. By adoption of the structure, liquid crystals do not exist between two adjacent electrode groups, and hence LC disclination will not be caused.

In at least one embodiment of the present invention, the partition is a polymer partition. The partition may also be a partition made from other materials. For instance, the partition may also be a resin partition.

For instance, the material for forming the polymer partition comprises diacrylate.

In at least one embodiment of the present invention, common electrodes are respectively disposed on the upper substrate and/or the lower substrate, at positions corresponding to the transparent partitions. For instance, the common electrodes may be only disposed on the upper substrate, at the positions corresponding to the transparent partitions, or the common electrodes may be only disposed on the lower substrate, at the positions corresponding to the transparent partitions, or the common electrodes are respectively disposed on the upper substrate and the lower substrate, at the positions corresponding to the transparent partitions. As illustrated in FIG. 4, detailed description is given in at least one embodiment of the present invention by taking the case that the common electrodes 21 are disposed on both the upper substrate 1 and the lower substrate 2, at the positions corresponding to the transparent partitions 22, as an example.

In at least one embodiment of the present invention, the LC lens further comprises electrode group driving elements (circuits) electrically connected with the electrode groups 10 in the pixel areas and configured to apply corresponding voltages to the strip electrodes 11 in each electrode group 10. In at least one embodiment of the present invention, the LC lens further comprises common electrode driving elements (circuit) connected with the common electrodes 21 and configured to apply a common voltage to the common electrodes 21.

Figure 6:
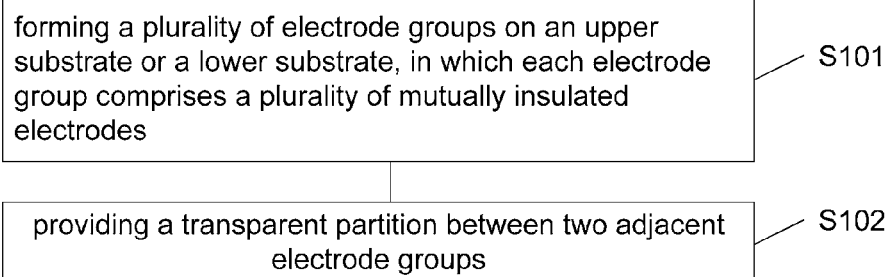
FIG. 6 is a schematic diagram of a method for manufacturing an LC lens, provided by the embodiment of the present invention.

At least one embodiment of the present invention provides a method for manufacturing an LC lens. FIG. 6 is a schematic diagram of the method for manufacturing the LC lens, provided by an embodiment of the present invention. The method comprises the following steps.

Step 101: forming a plurality of electrode groups on an upper substrate or a lower substrate, in which each electrode group comprises a plurality of mutually insulated electrodes.

Step 102: providing a transparent partition between two adjacent electrode groups.

It should be noted that the sequence of the step 101 and the step 102 may also be exchangeable. That is to say, the partitions are formed first and then the plurality of electrode groups is formed on the upper substrate or the lower substrate. In another example, the partitions are formed on the upper substrate while the plurality of electrode groups is formed on the lower substrate.

The upper substrate and the lower substrate are arranged opposite to each other to form a liquid crystal cell, and liquid crystals are filled within the liquid crystal cell.

Figure 7:
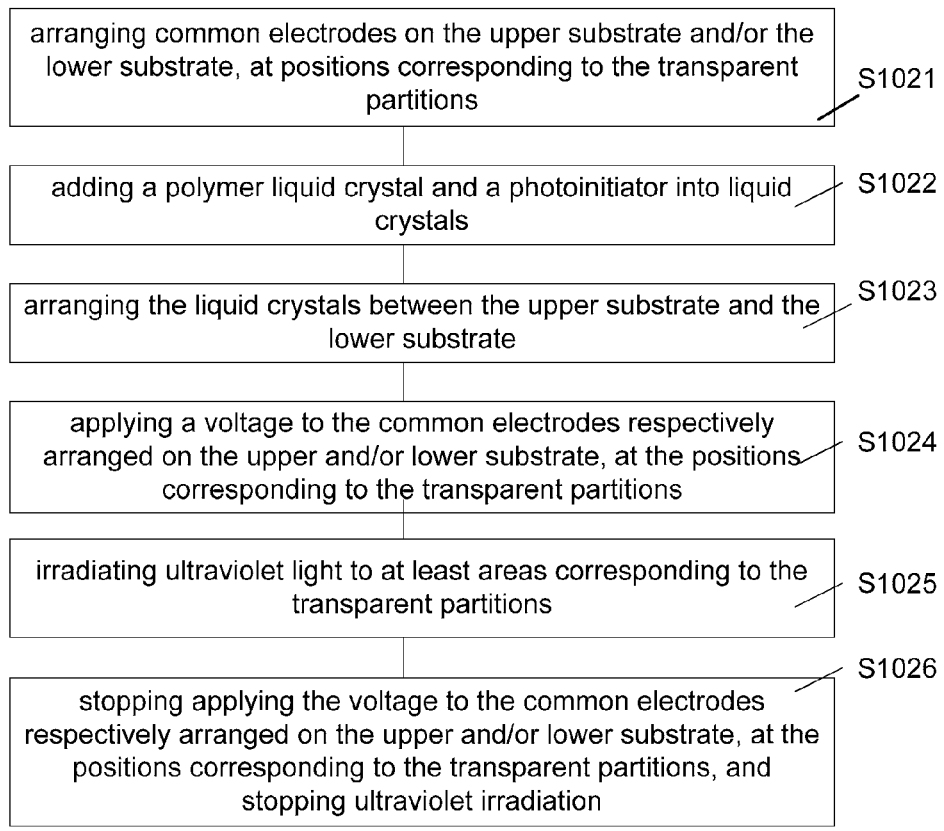
FIG. 7 is a schematic diagram of a method for forming a transparent partition, provided by the embodiment of the present invention.

FIG. 7 is a schematic diagram of a method for forming a transparent partition, provided by at least one embodiment of the present invention, and the method comprises the following steps.

Step 1021: arranging common electrodes on the upper substrate and/or the lower substrate, at positions corresponding to the transparent partitions.

In at least one embodiment of the present invention, the common electrodes may be only disposed on the upper substrate, at the positions corresponding to the transparent partitions, or the common electrodes may be only disposed on the lower substrate, at the positions corresponding to the transparent partitions, or the common electrodes may be also respectively disposed on the upper substrate and the lower substrate, at the positions corresponding to the transparent partitions, Detailed description is given in at least one embodiment of the present invention by taking the case that the common electrodes 21 are disposed on both the upper substrate and the lower substrate, at the positions corresponding to the transparent partitions, as an example.

Step 1022: adding a polymer liquid crystal and a photoinitiator into liquid crystals.

For instance, the polymer liquid crystal comprises diacrylates, cholesteryl benzoate, N-(4-methoxybenzylidene)-4-n-butylaniline (MBBA) or the like or any combination of the materials. Detailed description is given in at least one embodiment of the present invention by taking the case that the polymer liquid crystal is diacrylates as an example. The photoinitiator comprises 2-hydroxy-2-methyl-1-phenyl propanone, methyl benzoylformate, benzoin and derivatives or the like or any combination of the materials.

Step 1023: arranging the liquid crystals between the upper substrate and the lower substrate.

Step 1024: applying a voltage to the common electrodes respectively arranged on the upper substrate and/or the lower substrate, at the positions corresponding to the transparent partitions.

When the common electrodes respectively arranged on the upper substrate and/or the lower substrate, at the positions corresponding to the transparent partitions, are applied with the voltage, diacrylate monomers aggregate around the common electrodes under the effect of the applied voltage.

Step 1025: irradiating ultraviolet light to at least areas corresponding to the transparent partitions.

The ultraviolet light can trigger the photoinitiator, and under the action, diacrylates react with the photoinitiator to form a polymer wall (namely a partition). The influence of adjacent lens electrodes can be shielded by the blocking function of the partition.

Step 1026: stopping applying the voltage to the common electrodes respectively arranged on the upper substrate and/or the lower substrate, at the positions corresponding to the transparent partitions, and stopping ultraviolet irradiation.

It should be noted that the polymer partitions can only be formed by the implementation of steps 1024 and 1025 and therefore the sequence of steps 1024 and 1025 may be exchanged. For instance, step 1025 may be performed first and then step 1024 is performed, or steps 1024 and 1025 are performed at the same time. Detailed description is given in at least one embodiment of the present invention by only taking the above listed specific steps as an example.

An embodiment of the present invention provides a display device, which comprises any foregoing LC lens provided by the embodiment of the present invention. The LC lens is disposed on a light-emitting surface of a display panel, and for instance, is configured to achieve 3D display. The display device may be a display device such as a liquid crystal display (LCD), e-paper and an organic light-emitting diode (OLED) display and any product or component comprising the display device and having display function, e.g., a TV, a digital camera, a mobile phone and a tablet PC. The display device can improve the 3D display effect through the LC lens provided by any embodiment of the present invention.

The foregoing is only the preferred embodiments of the present invention and not intended to limit the scope of protection of the present invention. The scope of protection of the present invention should be defined by the appended claims.

The application claims priority to the Chinese patent application No. 201310575136.0 submitted on Nov. 15, 2013. The disclosure content of the Chinese patent application is incorporated by reference herein as part of the present application.

The invention claimed is:

1. A liquid crystal (LC) lens, comprising a first substrate, a second substrate and a liquid crystal layer disposed between the first substrate and the second substrate, wherein
a plurality of electrode groups is disposed on the first substrate; each electrode group comprises a plurality of mutually insulated electrodes; and a transparent partition is disposed between two adjacent electrode groups, and
wherein a first common electrode is provided on the first substrate and interposed between the transparent partition and the first substrate, and a second common electrode is provided on the second substrate and interposed between the transparent partition and the second substrate; and the transparent partition is disposed between the first common electrode and the second common electrode in a direction from the first substrate to the second substrate.

2. The LC lens according to claim 1, wherein the transparent partition runs through the whole liquid crystal layer.

3. The LC lens according to claim 1, wherein the transparent partition is a polymer partition.

4. The LC lens according to claim 3, wherein a material for forming the polymer partition comprises diacrylates.

5. A display device, comprising the LC lens according to claim 1.

6. The LC lens according to claim 2, wherein the transparent partition is a polymer partition.

7. The LC lens according to claim 6, wherein a material for forming the polymer partition comprises diacrylates.

8. A liquid crystal (LC) lens, comprising a first substrate, a second substrate and a liquid crystal layer disposed between the first substrate and the second substrate, wherein a plurality of electrode groups is disposed on the first substrate; each electrode group comprises a plurality of mutually insulated electrodes; and a transparent partition is disposed between two adjacent electrode groups, and wherein a first common electrode is provided on the first substrate, and a second common electrode is provided on the second substrate, the transparent partition is disposed between the first common electrode and the second common electrode in a direction from the first substrate to the second substrate, and the first common electrode and the second common electrode are insulated from each other and at least partially overlapping in the direction from the first substrate to the second substrate.

9. A method for manufacturing an LC lens, comprising:
providing a first substrate, in which a plurality of electrode groups is formed on the first substrate and each electrode group comprises a plurality of mutually insulated electrodes;
providing a second substrate;
arranging the first substrate and the second substrate opposite to each other, providing liquid crystals between the first substrate and the second substrate, and providing a transparent partition between two adjacent electrode groups;
arranging a first common electrode on the first substrate and between the transparent partition and the first substrate; and
arranging a second common electrode on the second substrate and between the transparent partition and the second substrate.

10. The manufacturing method according to claim 9, wherein providing a transparent partition between two adjacent electrode groups comprises:
adding a liquid crystal polymer and a photoinitiator into the liquid crystals;
applying a voltage to the first common electrode and the second common electrode respectively arranged on the first substrate and the second substrate;
irradiating ultraviolet light to at least areas corresponding to the transparent partition; and
stopping applying the voltage to the first common electrode and the second common electrode respectively arranged on the first substrate and the second substrate, and stopping ultraviolet irradiation.

11. The manufacturing method according to claim 9, further comprising adding a liquid crystal polymer into the liquid crystals, wherein the liquid crystal polymer is diacrylates.

12. The manufacturing method according to claim 10, wherein the liquid crystal polymer is diacrylates.

* * * * *